United States Patent [19]
Brady et al.

[11] Patent Number: 5,263,145
[45] Date of Patent: Nov. 16, 1993

[54] METHOD AND MEANS FOR ACCESSING DASD ARRAYS WITH TUNED DATA TRANSFER RATE AND CONCURRENCY

[75] Inventors: James T. Brady; Ruth E. Cintron; Stephen Goldstein; Jean H. Wang Ju; Jaishankar M. Menon, all of San Jose, Calif.

[73] Assignee: International Business Machines Corporation, Armonk, N.Y.

[21] Appl. No.: 528,999

[22] Filed: May 24, 1990

[51] Int. Cl.$^5$ .............................................. G06F 12/02
[52] U.S. Cl. ................................. 395/425; 395/575; 364/DIG. 2; 364/964; 364/952.1; 364/959.3; 364/957.1
[58] Field of Search ... 364/200 MS File, 900 MS File; 395/425, 275, 575; 371/2.2, 10.1

[56] References Cited

U.S. PATENT DOCUMENTS

| | | | |
|---|---|---|---|
| 3,336,582 | 8/1967 | Beausoleil et al. | 340/172.5 |
| 4,092,732 | 5/1978 | Ouchi | 395/575 |
| 4,571,674 | 2/1986 | Hartung | 395/425 |
| 4,603,380 | 7/1986 | Easton et al. | 395/425 |
| 4,761,785 | 8/1988 | Clark et al. | 371/51 |
| 5,077,736 | 12/1991 | Dunphy, Jr. et al. | 371/10.1 |
| 5,088,081 | 2/1992 | Farr | 369/54 |
| 5,124,987 | 6/1992 | Milligan et al. | 371/10.1 |

OTHER PUBLICATIONS

Patterson et al, "A Case for Redundant Arrays of Inexpensive Disks (Raid)", ACM SIGMOD Conference, Chicago, Illnois.

Primary Examiner—Debra A. Chun
Attorney, Agent, or Firm—R. Bruce Brodie

[57] ABSTRACT

A method and means for managing access to a logical track of KN blocks of which K are parity blocks. The KN blocks are distributed and stored in an array of N DASDs having K blocks per physical track per DASD. The array includes control means for securing synchronous access to selectable ones of the DASDs responsive to each access request. The method involves (a) formatting the blocks onto the array using a row major order modulus as the metric for balancing the data rate and concurrency (the number of DASDs bound per access) and (b) executing the random sequences of large and small access requests over the array.

10 Claims, 4 Drawing Sheets

METHOD AND MEANS FOR ACCESSING DASD ARRAYS WITH TUNED DATA TRANSFER RATE AND CONCURRENCY

FIELD OF THE INVENTION

This invention relates to accessing DASD arrays as external storage by CPU's having high instruction processing and high data transfer rates. More particularly, the invention relates to tuning the array to optimize data transfer rate and concurrency.

DESCRIPTION OF RELATED ART

The prior art of DASD arrays as high volume synchronous storage and high data rate sending and receiving devices are extensive. The critical point is that of identifying parametric trade offs between occupancy and rates. In the following paragraphs the DASD is briefly discussed at the device level and then at the array level. This is followed by a discussion of the past resolution of matching arrays to CPU's.

ATTRIBUTES OF DASD

A DASD is a constant speed rotating magnetic storage disk device supporting direct access by read/write heads. Because the magnetic disk medium is rotating, each data access requires positioning movable read/write heads in space and time over concentric tracks on the disk. The disk is also characterized as being a cyclic track recording medium.

The space component is resolved by radially positioning a read/write head to a designated track via a servo control loop. Pre-recorded servo reference information is used to guide the radial positioning. It is sensed either from information embedded/encoded onto the track being accessed or from a disk side dedicated for that purpose.

The time component is resolved as a function of disk rotation by sensing rotational positional information either on the track or externally supplied. Ideally, this means that the head should be positioned concurrently as portion of the track having the information of interest just starts to pass thereunder.

For purposes of this invention, data on each DASD track is considered to be of fixed block size of r bytes/block and K blocks per track. This does not preclude other data organization at higher logical levels or views such as variable length records in count-key-data (CKD) format being mapped and resolved onto DASD as a variable number of K blocks/CKD record.

INCREASED DASD CAPACITY

DASD storage capacity has increased as a function of improving the recording attributes of the magnetic surface coatings, the geometry of near optical resolution of vanishingly small magnetic spots on the recording surfaces, and the number of disks per DASD spindle. The coatings constitute surfaces of highly differentiated regions of bistable remanent magnetization. The geometry requires micro-inch separation between head and disk and further requires unique head designs. Thus, the recordable bits per inch along each track and in the number of tracks per inch measured radially are demonstrably higher.

DATA UNAVAILABILITY AND DATA RATE MISMATCH

High capacity DASD using multiple disks per spindle have gigabyte data recording capacities. While such storage capacities are impressive, significantly, neither single large DASD nor ganged asynchronous strings of them can match the data availability and data rate needs of broad bandwidth SISD, SIMD and MIMD CPU processors. Parenthetically, SISD refers to a CPU having a single instruction stream operating on a single data stream. SIMD refers to a CPU having single instruction stream executing over multiple data streams while MIMD connotes a CPU having multiple instruction streams executing over multiple data streams.

"Data availability" is a measure of access to data by an application even in the presence of path failure or noise. Typically, if a portion of external storage fails, then the access request fails. Consequently, the application execution becomes interrupted and the application rolls back to a prior point of information consistency. Most of the literature has focussed on log based application recovery, on-the-fly data repair, or operation redo.

A "data rate mismatch" between any information source and sink is traditionally managed either by buffering or interlocking. Buffering decouples the source and sink by way of introduction of a time delay in the access path and the overhead of managing the buffer read and write. The time delay is manifest as the minimum sized memory for a given fill rate that also represents the time difference in the data rates.

"Interlocking" is a form of polling in which the device with the slowest data rate paces the transfer across an interface. In this regard, reference should be made to Beausoleil et al U.S. Pat. No. 3,336,582, "Interlocked Communication System", issued Aug. 15, 1964.

A typical mismatch involves a CPU executing 100 million instructions per second and a 100 MByte/sec data transfer rate communicating with a gigabyte DASD having a 1 to 3 MByte transfer rate and a 10 millisec access time. Clearly, an unaided buffer or cache solution in the order of a million or more bytes to accommodate the 100/1 to 30/1 speed change with its attendant costs would be required. An interlock is out of the question as the interface would reduce the useful pace of the fastest component to that of the slowest (DASD access) component.

PRIOR ART SOLUTION IS FOUND IN SYNCHRONOUS PARALLEL TRANSFER

The general solution with respect to data rate matching in the prior art is to access N synchronized DASDs in parallel. Synchronous behavior requires N DASDs to rotate at the same rpm, have the same angular offset, and be accessed in an identical manner at the same time. This solution maximizes data transfer rate. However, it serves only one access at a time and does not optimize resource use with respect to large and small read and write requests.

ASPECTS OF THE DASD ARRAY

An "array" is abstractly defined as a subscripted variable in which the subscript indexes the relative position order of each instance of the variable. The components of the subscript also define the dimensions of the array. Thus, array $A(i,j)$ specifies a variable "A" whose relative position ordered instances are mapped onto a two dimensional closed integer intervals $(1,1<$-

(i,j)<N,K). The array dimensions may be mutually exclusive such that the closed integer intervals 1<i<N and 1<j<K could denote an ordering (indexing) of like devices and time respectively, N and K being integer upper bounds.

As used in this invention a "closed integer interval" is one over which an index variable can assume all interval values including the end points. By convention, one array dimension is designated as a column order and the other as a row order.

As a physical storage system, an array of N DASDs is defined to be any physical arrangement of N DASDs selective ones (or all) of which can be accessed in concurrency. Relatedly, the formatting and subsequent read/write accessing of an array, as a logical/physical store proceeds by copying/inserting values in consecutive positions on either a row or a column basis. If the operation is performed in a column direction, it is designated as being performed in "column major order". Likewise, if performed a row direction, it is designated as being performed in "row major order". Next, the mapping is done from the logical "array" to the physical store (i.e. ganged group of DASDs).

The accessing/addressing problem is that of mapping NK blocks of an arbitrary logical track onto K blocks per physical track over N DASDs. The K block contents of a physical track can be mapped onto a time line such as that defined by a single DASD disk rotation. For the ith DASD, the contents of each block position on the time line or counterpart track extent constitute K column entries for the ith row. Likewise, for any jth time line segment or angular position along a physical track on a counterpart disk from each of the N DASDs, the contents of N blocks occupying that sector over N DASDs constitute N row entries for the jth column.

The storage model, as viewed from a CPU, appears as a single logical store providing data at N−1 times the data rate of a single DASD and having N−1 times the capacity of the native device. The model assumes that of the NK blocks per logical track, K blocks are dedicated to parity spanning a predetermined number of the (N−1)K data blocks. The inherent concurrency of DASDs in an array permits the logical store to remain operable, even in degraded mode, over a longer interval (mean time between failures) than the MBTF interval of single DASD.

THE OUCHI AND CLARK PATENTS

Reference should be made to Ouchi, U.S. Pat. No. 4,092,732, "System for Recovering Data Stored in a Failed Memory Unit", issued May 30, 1978. Ouchi discloses the spreading of data blocks from the same logical file across a string of N−1 DASDs and recording a parity block on the Nth DASD which parity block is an XORing of the parity contents of the N−1 other blocks. Contents from any single inaccessible DASD can be recovered by XORing the parity blocks with the blocks stored on the N−2 remaining accessible DASDs. A similar result can be achieved if the parity blocks are not available.

Clark et al, U.S. Pat. No. 4,761,785, "Parity Spreading to Enhance Storage Access", issued Aug. 2, 1988, modifies Ouchi by distributing parity blocks over DASDs such that the unavailability of one DASD (i.e. the parity DASD in Ouchi) would render all parity blocks unavailable especially for operation in degraded mode.

INTRA-BLOCK PARITY AND THE PARITY CODE BLOCK

Typically in block oriented data, a parity suffix or equivalent (Hamming, CRC) is appended to each data block. Thus, each parity suffix can be invoked to detect-/correct intra-block error. As described in Ouchi, when one or more of the blocks of an N−1 sequence are unavailable, a parity block, which a' priori spans the N−1 block sequence, is used in conjunction with the remaining blocks to rebuild the unavailable data block. Efficient codes per se (Hamming, Cyclic Redundancy Check, Reed- Solomon) are elsewhere treated in the literature and are deemed ancillary to the invention as subsequently described.

PATTERSON'S DASD ARRAY LEVELS AND TYPES

Patterson et al, "A Case for Redundant Arrays of Inexpensive Disks (RAID)", ACM SIGMOD Conference, Chicago Ill. Jun. 1-3, 1988 discusses various ways of organizing redundant data and DASDs to enhance data availability. The arrangements are classified into five levels.

The first level (Mirrored Disks) assumes a fully duplexed arrangement of DASDs in which all reads and writes are duplexed.

The second level (Hamming Code) synchronously reads and writes to N DASDs in tandem (parallel) in which the upscale parity code such as a Hamming ECC) whose overlapping parity ranges are invoked to detect and/or correct errors.

The third level also synchronously reads and writes to N DASDs. However, N−1 DASDs contain data and one DASD contains a parity ranging over the other data DASDs. That is, one check DASD is provided for the group. The contents of the failed DASD can be reconstructed in the manner of Ouchi.

The fourth level improves performance with respect to small read and write accesses. This is achieved by storing blocks along the column extent so that in a first time slot (DASD sector 1) blocks 1 to N can respectively be stored on DASD 1 to N while in the second time slot (DASD sector 2) blocks N+1 to 2N are stored etc. In the Kth time slot (DASD sector K) blocks [(K-1)]*N+1 to KN are stored on corresponding devices.

In addition to column track layout, the fourth level permits access to DASD individually. This means that small transfers can occupy few DASDs while large transfers can also be accessed synchronously across N devices.

For purposes of this invention, the Patterson's level 3 and level 4 are designated as Type 1 and Type 2 DASD arrays.

THE TYPE 1 DASD ARRAY

A type 1 (Patterson's level 3) is also described by Kurzweil, "Small Disk Arrays- The Emerging Approach to High Performance", COMPCON Spring 1988, March 1988 Meeting in San Francisco. Relatedly, the Type 1 array has been found effective for those applications transferring large amounts of sequentially stored data with each read/write (I/0) request (large read/write). In contrast, performance markedly falls off where many random requests for small amounts of data are made (small read/write).

TYPE 2 AND TYPE 2V ARRAYS

A type 2 DASD array (Patterson's level 4) uses N synchronized DASDs and provides the image of a single DASD with N−1 times the capacity and track size of the native device from block 1 through block KN. In spite of having the appearance of a single DASD, it has the capability of accepting and executing multiple requests against it in parallel. It provides N−1 times the data rate of the native device on large data transfers, while it attempts to match the performance of the native device on small data transfers. Finally, it achieves high availability by storing parity and spreading it among the N DASDs of the array in column major order. When a DASD fails, the data that was stored on it can be recreated by reading the data and parity stored on the remaining N−1 DASDs.

Where the blocks are stored in a type 2 array in vertical or column major order and the parity block for each column is diagonally striped, then the array will be designated as type 2V. By this is meant that the parity block for the first column for blocks 1 to N−1 is stored on DASD N. The parity block for the second column for blocks N+1 to 2N is stored on DASD N−1. Likewise, for column 3 blocks 2N+1 to 3N, the parity block is ensconced in DASD N−2 etc.

SMALL/LARGE READ AND WRITES TO A TYPE 2V ARRAY

Operationally, a type 2 DASD array is subject to small and large reads and writes. The read operations are the easiest to implement because the information state of the array is not altered. The write operations do alter the array information state including the parity block.

A small read request such as a request to read just block 1, would cause DASD 1 to generate its first block. There would be no need to read the parity block N on DASD N in view of the fact that the parity such as ECC appending each data block should be sufficient to detect/correct any intra-block error. Thus, only one DASD is busy while all other DASDs are available to handle other requests.

In the event a small update write request to block 1 is made, then updates must be made to both to block 1 on DASD 1 and the parity block N on DASD N. The operation is accomplished first by reading old blocks 1 and N followed by writes of new blocks 1 and N to DASDs 1 and N, where new block N=(old block N) XOR (old block 1) XOR (new block 1).

Recall that in a type 2V array, the blocks are stored in column major order with parity blocks diagonally striped. Blocks 1 to N are written to DASDs 1 to N while blocks N+1 to 2N are written to DASDs 1 to N. A request to update block N+2 on DASD 2 can be concurrently processed with update of block 1 on DASD 1. In this case, DASD pairs (1, N) and (2, N-1) are involved without conflict. However, a request to update blocks 1 and 2 or blocks 1 and N+1 result in conflict. In the first instance, the updates involve the same parity block and DASD N. In the second instance, they involve the same data DASD 1.

The aim of a large read is to read data from as many physical DASD as possible. Thus, a synchronized read of DASD 1 to N satisfies this expectation. In connection with large writes, optimum performance relies on synchronously processing a column at a time. Anything less requires processing as per small writes.

SUMMARY OF THE INVENTION

It is an object of this invention to devise methods and means for optimally matching the effective data rate and availability of a DASD array to high performance CPU's.

It is a related object to devise such method and means where the CPU references the array as an external store with mixed sequences of random and sequential addresses, otherwise denominated as large and small read and write requests.

It is another related object to ensure that such method and means are operable with a DASD cache.

The above objects are satisfied by a method for managing access to a logical track of KN blocks of which K are parity blocks. The KN blocks are distributed and stored in an array of N DASDs having K blocks per physical track per DASD. The array includes control means for securing synchronous access to selectable ones of the DASDs responsive to each access request. The method steps comprise (a) formatting the blocks onto the array using a row major order modulus as the metric for balancing the data rate and concurrency (the number of DASDs bound per access) and (b) executing the random sequences of large and small access requests over the array.

More particularly, the method steps comprise (a) formatting the KN blocks on the array in row major order modulo M and in column major order modulo MN, M lying in the closed interval (1,K); and (b) executing large and small access requests over the N DASD array whereby the minimum number X of blocks transferred to achieve the maximum data rate for a given M is $(N-1)M$ and lies in the closed interval $((N-1, (N-1)K)$, the end points of the latter interval being defined by $M=1$ and $M=K$ respectively.

As a consequence of the method of this invention, the data rate varies directly with the number of DASDs accessed in parallel to satisfy each request and inversely with M. Likewise, availability or concurrency varies directly with M and inversely with the number of DASDs tied to each request.

An additional consequence of formatting KN blocks row major K modulo M and column major K modulo MN is that parity blocks are distributed across N DASD modulo M at a track rather than at a block level. This assists in concurrency for M greater than 1.

Advantageously, a cache can assist smoothing the CPU array relationship. Where a cache is used, end of physical track staging and row column major formatting of the DASDs in the array facilitate DASD array-cache transfer.

While the metric M has been discussed with respect to the precincts of a single logical track, it should be appreciated that a logical cylinder comprising many logical tracks may well have M varying in its span or value from track to track. Correlatively, the absolute upper bound for M is less than or equal to T*K where T = the number of logical tracks. In this latter case, concurrency is conserved at the expense of data rate. That is, the system would have to await the passage of TNK blocks prior to attaining a maximum data rate.

DESCRIPTION OF THE PREFERRED EMBODIMENT

Figure 1:
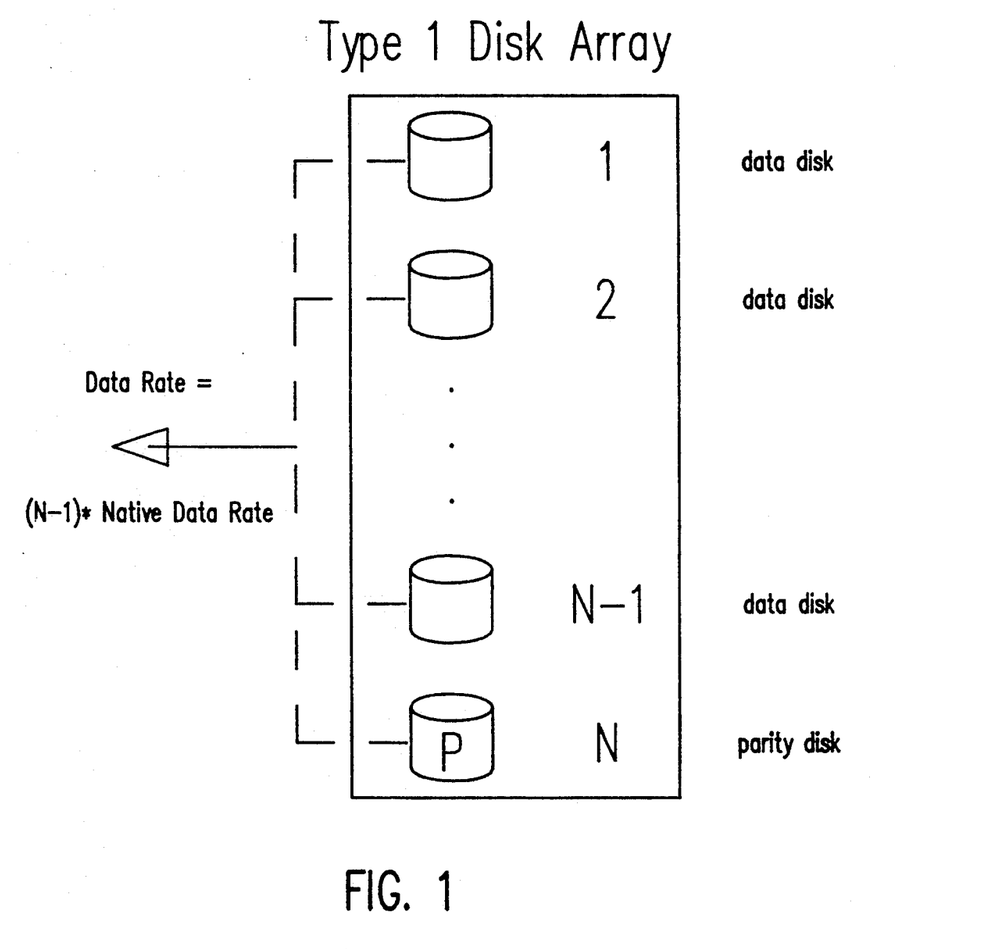
FIG. 1 depicts a type 1 DASD array according to the prior art.

Referring now to FIG. 1, there is depicted a type 1 DASD array of N synchronous DASDs over which the blocks of a recorded are written in column major order with the Nth DASD always containing the parity block in the manner of the Ouchi patent. Advantageously, the data rate is increased N−1 times the transfer rate of a single DASD and has found use where large read/writes were involved.

DASD ARRAY WITH CACHE

Figure 2:
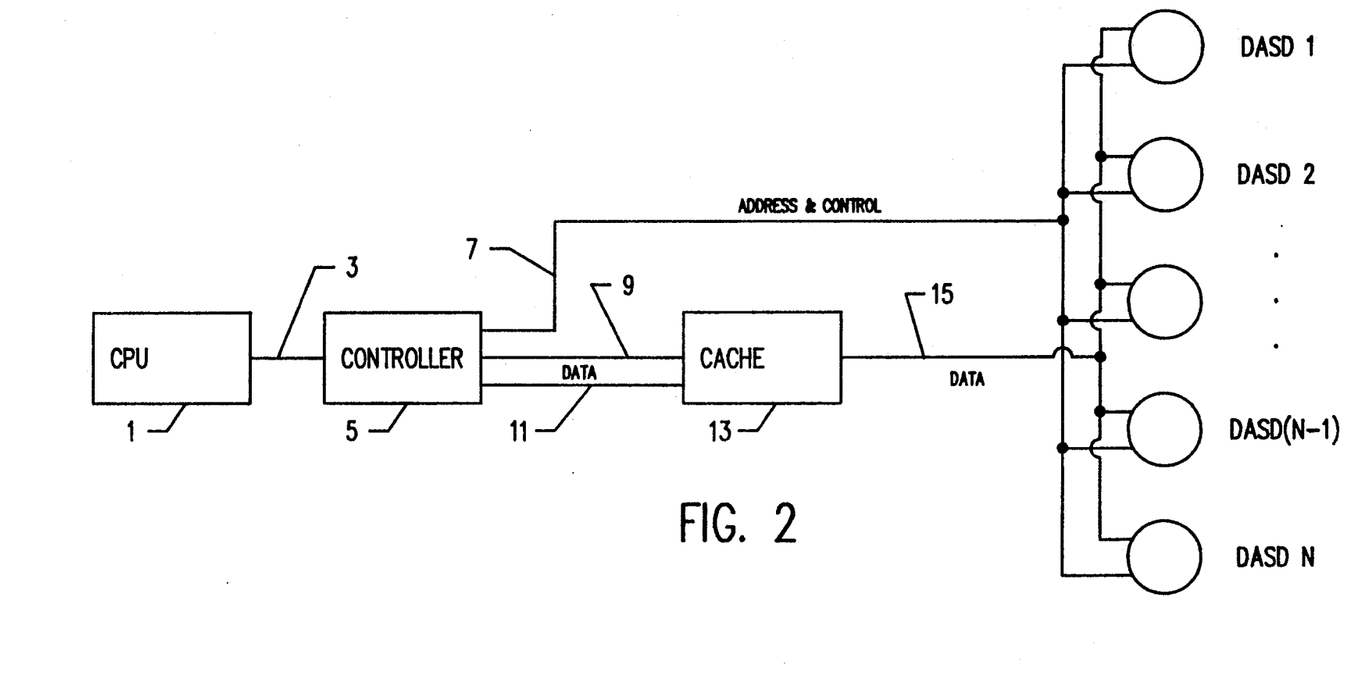
FIG. 2 sets forth a DASD array with a cache attached.

Referring now to FIG. 2, there is shown CPU 1 accessing DASD 1 through N over a path including channel 3 array controller 5 and cache 13. CPU 1 may be of a modern high performance SISD, SIMD or MIMD type.

A SISD CPU typically includes an instruction processor with a resident operating system (OS), RAM oriented internal store, and an external store coupling the processor or internal store, over a connecting electrical paths. In SIMD architectures (array and vector processors), the operand fetch, execution, and result store are replicated so that a single instruction enables several values to be concurrently fetched, manipulated, and results stored.

As an alternative to SISD and SIMD, multiple instruction streams can be processed concurrently over multiple data streams (MIMD). This generates an instruction execution rate which is directly proportional to the number of participating processors. In MIMD architecture, execution of one instruction does not necessarily influence the execution of other instructions due to the independence of each of the processors even though two or more processors may access shared storage. MIMD processes executing on individual processors still may execute instructions in sequence. Such sequences may also be a periodically punctuated by data exchanges with other processors or shared external storage.

Controller 5 operatively secures synchronism and accesses among DASD 1 through N over control path 7. Responsive to an access, N bytes of data can be exchanged in parallel to cache 13 over data path 15. Likewise, data can be exchanged serially by byte between CPU 1 and cache 13 over control and data paths 9 and 11 via the controller 5 and path 3.

Placement of cache 13 in the array alters the view of storage as seen by CPU 1. This caches smooths and facilitates any application running on CPU 1 accessing information in a block organized logical DASD having one or more logical tracks organized into logical cylinders. The smoothing derives from the cache operating as a specialized buffer decoupling the cache/array interaction from the CPU/cache interface. That is, it reduces the data rate differences since cache reference rate to the DASD array should be significantly less than the CPU reference rate to the cache for at least random (non-sequential) accesses.

In this regard, the cache may be of the LRU managed type. This means that read or write data block access requests are first made to the cache. In the event that the blocks are not stored in cache, then the request is passed onto the array DASDs proper and the blocks staged up to the cache. LRU is an acronym connoting that in the event the cache is full, then the least recently referenced blocks sufficient to accommodate the currently requested ones will be destaged. For recovery and other purposes the cache can be of the write through type. That is, where blocks are updated, they are written through to DASD array as well as to cache. It has been found that staging from DASD to the cache should use either "stage to end of track" (STEOT) or record staging and that the DASD array should be formatted in "row major order K modulo M" as discussed subsequently.

TYPE 2V ARRAY REVISITED

Figure 3:
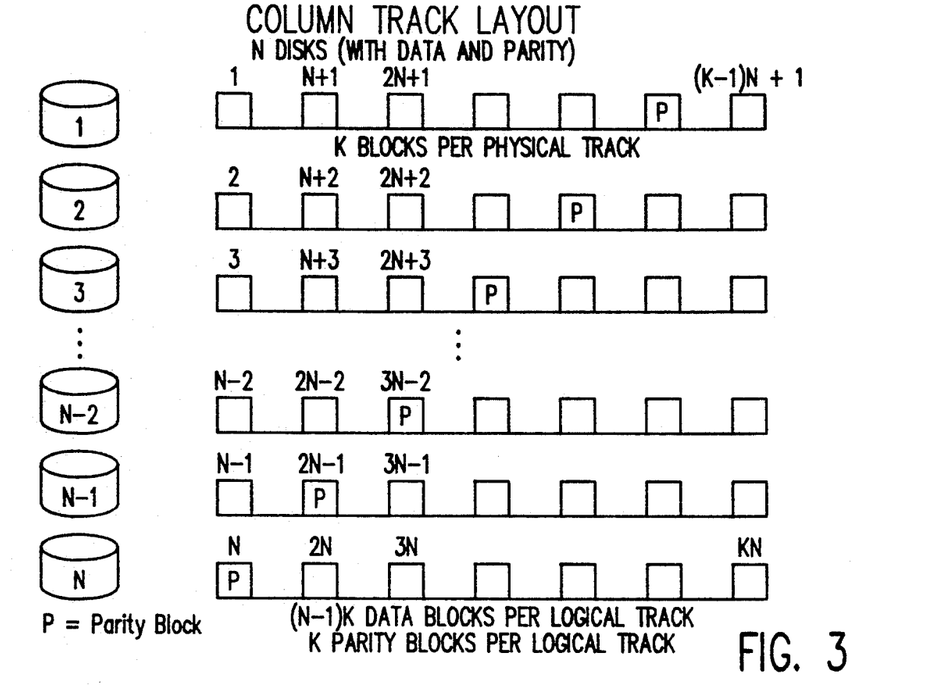
FIG. 3 shows the mapping of KN blocks of a logical track onto an array of N DASDs of the type 2V in column major order and diagonally striped parity blocks among the N DASD according to the prior art.

Referring now to FIG. 3, KN blocks are formatted in column major order. Also, each parity block spans the N−1 other blocks in its column. However, the K parity blocks are diagonally striped across the DASD. In the event of concurrent write operations, the diagonal striping avoids making any one disk contentious as would be the case if all parity blocks were on a parity disk.

Where K>>N, then the striping would occur K modulo N. Furthermore as mentioned above, current read and write of different blocks in the same column (since they are located on different DASD) is possible. Notwithstanding, concurrent writes to blocks in the same column or to blocks on the same DASD are to be avoided. In the first case, the same parity block can only be changed serially while in the second case the same DASD can only be written or read in serial order.

TYPE 2H ARRAY AND ASPECTS OF MULTIPLE LOGICAL TRACKS, PARITY BLOCKS AND CACHES

Figure 4:
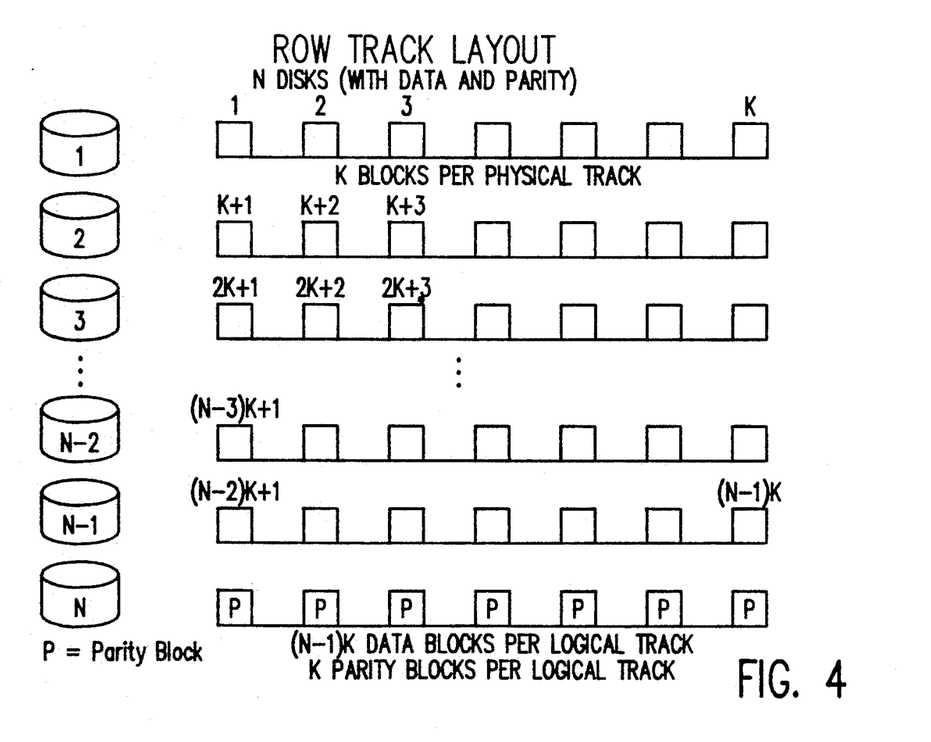
FIG. 4 sets forth the mapping of KN blocks of a logical track onto an array of N DASDs of the type 2H in row major order K modulo M where M=K and a row of K parity blocks on the Nth DASD spanning counterpart column blocks per the invention.

Referring now to FIG. 4, there is shown the mapping of KN blocks of a logical track onto an array of N DASDs of the type 2H in row major order K modulo M where M=K and a row of K parity blocks on the Nth DASD spanning counterpart column blocks.

The array shown FIG. 4 has N DASDs, K blocks per physical track, and NK blocks per logical track. However, unlike the column major order layout order of type 2V array, the KN consecutive blocks of the logical track in FIG. 4 are stored in row major order along a counterpart physical DASD track. Also, that the parity blocks in the 2H array is different from the 2V array. For the KN blocks of the group or logical track shown in the FIG. 4, the K parity blocks are stored on the physical track of DASD N. Then, for the KN blocks of a second group or logical track (not shown in FIG. 4), the K parity blocks would be stored on a predetermined track on DASD N−1. Similarly, the KN blocks of a third group or logical track would have their K parity blocks stored on DASD N−2 and so on.

Figure 5:
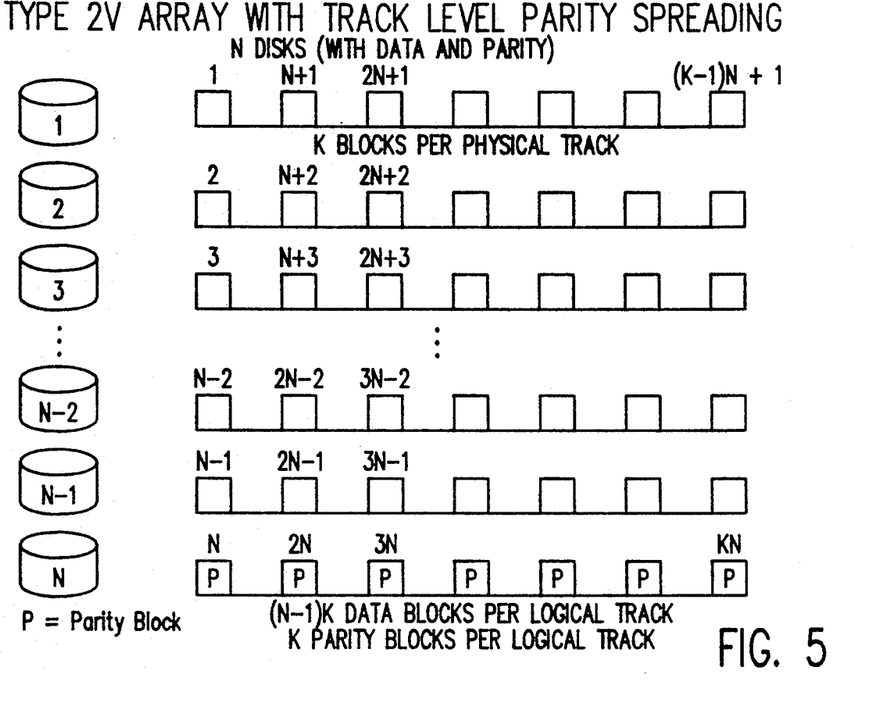
FIG. 5 shows the mapping on to a type 2V array as in FIG. 3 with the modification that the parity blocks are spread as in FIG. 4.

By use of this parity block spreading advantage can also be seen with respect to type 2V array in addition to the type 2H array. Reference should be made to FIG. 5 which depicts track level parity spreading for the type 2V array. Consider a request to update two consecutive data blocks, where one of the data blocks is the last block in a column. Referring back to FIG. 3, and given a request to update blocks 2N and 2N+1, then it is clear that we would need to access four DASDs to complete this request, since block 2N−1 on disk N−1 and block 3N−2 on disk N−2 also need to be accessed in order to get at the parity blocks. For the parity spread per FIG. 5, to update consecutive data blocks 2N−1 and 2N+1, it is apparent that only access three DASDs need be made, since all the parity is on disk N.

CACHE STAGING REVISITED

Consider, for example, a read of Block 1 in a type 2V array per FIG. 3. Following a DASD access to read Block 1, then staging to to end of physical track in DASD 1 would yield Blocks N+1, 2N+1, 3N+1, etc. Since these are not sequential blocks in the logical track, they are the wrong blocks to stage. To stage sequential blocks following Block 1, access all the other N−1 DASDs is required. This is complicated and it would also reduce concurrency on small requests.

In contrast, STEOT is easily implemented with row major track formatting. In this case, if the rest of the blocks on the same physical track as Block 1 are staged, then accessing sequential blocks in the logical track is accomplished. Furthermore, it has not been necessary to access any other DASD, so that we have not reduced the degree of concurrency possible on small requests.

SMALL READS AND WRITES TO A TYPE 2H ARRAY

Referring again to FIG. 4, a request to read Block 1 would cause physical DASD 1 to read its first block. There is no need to read data from the parity block (Block N) on physical DASD N, or from any other physical DASD. The behavior is identical to that of a Type 2 DASD array with column major formatting.

The performance improvement of Type 2 DASD array with row major formatting over that of column major formatting is apparent by considering a small request to read two blocks. A small request to read Blocks K+1 and K+2 in an array with row track layout would only cause physical DASD 2 to become busy in order to read 2 blocks. This is different from the Type 2 DASD array with column major formatting which would cause two physical DASDs to become busy to read two blocks. In general, the advantage of row major formatting is that small read requests will usually not keep more than one DASD busy.

Consider a request to update Block 1. As before, updating Block 1 would consist of a read of Blocks 1 and N followed by a write of Blocks 1 and N. Other updates to the same logical track cannot be done in parallel, but other updates to other logical tracks may be done in parallel. Next, consider a request to update Blocks 1 and 2. It is easy to see that such a request requires reading Blocks 1, 2, NK−K+1, and NK−K+2, and then writing these same four blocks. Thus, it requires access to two DASDs. Note, a similar request required accessing three DASDs formatted in column major order.

This example also illustrates the advantage of spreading parity blocks at a track level rather than at a block level. If the parity blocks had been spread among the DASDs at the block level, this request would have required accessing more than 2 DASDs. Lastly, consider a request to update Blocks K and K+1. Such a request requires access to three DASDs, since Blocks NK−K+1 and NK must also be accessed (a similar request with column track layout required accessing four DASDs).

LARGE READ AND WRITES TO A TYPE 2H ARRAY

For large reads, it is desired to read data from as many physical DASDs as possible so as to achieve the highest data rate. A minimum of one logical track needs to be read as part of the large read. A request that reads the first K blocks of the logical track will achieve a data rate no higher than that of the native device, a request that reads the first 2 K blocks of the logical track will achieve a data rate that is twice that of the native DASD (since it is desired to read from two DASDs in parallel), and so on. Therefore, row track layout balances concurrency with data rate. That is, if the request is smaller than a physical track, it achieves the lowest data rate with the highest concurrency, if the request is larger than a physical track, but smaller than two physical tracks, it achieves the next higher data rate with the next lower degree of concurrency, and so on. A request which reads an entire logical track ((N−1)K blocks) achieves the highest data rate (N−1 times native) and the lowest degree of concurrency (since all DASDs are active as part of the request).

The execution of large writes will have good performance only if the blocks to be updated satisfy certain conditions. In fact, best performance will only be achieved when full logical tracks are written. When full logical tracks are written, the parity data can be written at the same time. However, whenever we write less than a full logical track, this is not possible. Consider, for example, that the first 2K blocks have to be updated. Then, it is necessary to read Blocks 1 through K from DASD 1, Blocks K+1 through 2K from disk 2, and all the parity blocks from DASD N in the first revolution of the DASDs. In the second revolution of the DASDs, those same blocks from the same three DASDs can be written back. As a result, updates of less than a full logical track will take a revolution longer and essentially operate at ½ the maximum data rate.

GENERALIZATION OF THE TYPE 2H ARRAY—TYPE 2HV

Figure 6:
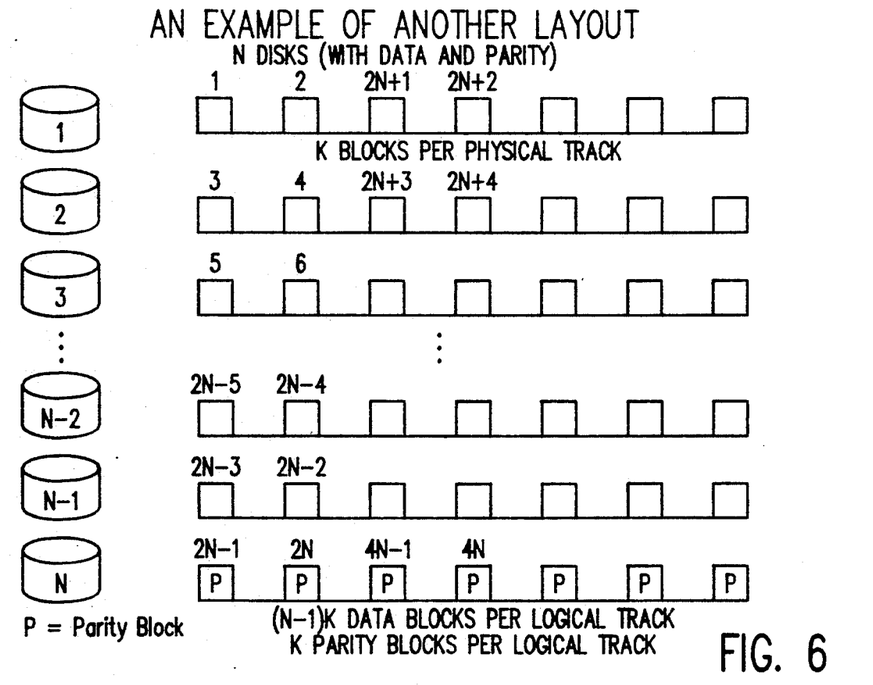
FIG. 6 depicts KN blocks of a logical track mapped onto an array of N DASDs of the type 2HV in row major order K modulo M and column major order modulo MN for M=2 in the closed interval (1,K) per the invention, the parity blocks being spread as in FIG. 4.

Referring now to FIG. 6, there is depicted the mapping of KN blocks of a logical track mapped onto an array of N DASDs of the type 2HV in row major order K modulo M and column major order modulo MN for M in the closed interval (1,K), (specifically, M=2 in the figure) the parity blocks being spread over the N DASDs modulo M.

The step of formatting the DASD array row major order K modulo M and column major order K molulo MN combines the best features of row and column major formatting. While row major order formatting requires a minimum transfer of (N−1)K blocks to achieve the maximum data rate, and column major order formatting requires only a minimum transfer of N−1 blocks to achieve the maximum data rate, the format depicted in FIG. 6 achieve the maximum data rate with a transfer size of 2N−2 blocks. This lies intermediate the two extremes of the row and column track layouts. This is termed a type 2HV array and represents the parameterized model thereof where M is the metric lying in the closed integer interval (1,K). Note that the setting of M also determines the column major modulus MN.

There are two extensions of this general case. First, M varies from logical track to logical track. Second, the upper bound for M can be placed arbitrarily greater than K. Indeed, the absolute upper bound is M less than or equal to |T*K|, where T is the number of logical tracks. The performance tradeoff is that the system would have to wait until TNK blocks were exchanged before the maximum data rate could be attained.

These and other extensions of the invention may be made without departing from the spirit and scope thereof as recited in the appended claims.

We claim:

1. A method for managing accesses received from an external source to at least one logical track having KN sequentially ordered blocks distributed and stored onto an array of N DASDs in which a single parameter M specifies the trade off between data rate and concurrency, each DASD including a cyclic track recording medium, each track having a storage capacity of K blocks, said array including control means for securing synchronous access to selectable ones of the N DASDs, comprising the steps at the control means of:

(a) formatting and writing of the KN blocks onto N tracks of the N DASDs of the array responsive to a command from said source specifying a value for parameter M, said blocks being written on said N tracks in row major order K modulo M and in column major order K module MN, M being less than or equal to K; and (b) executing access requests over the array from said external source such that each access of any subset of KN blocks formatted and written according to step (a) constitutes a synchronous data exchange of b blocks at a time with b counterpart DASDs and further such that (N−b) DASDs are concurrently available for binding to another access request, M being inversely related to b.

2. A method for managing access to at least one logical track of KN blocks of which K are partly in which a single parameter M specifies the trade off between data rate and concurrency, said KN blocks being distributed and stored in an array of N DASDs, each DASD including a cyclic track recording medium, each track having a storage capacity of K blocks, said array including control means responsive to read and write accesses from an external source for securing synchronous access to selectable ones of the N DASDs, comprising the steps at the control means of:

(a) formatting and writing of the KN blocks onto N tracks of counterpart N DASDs of the array responsive to a command from said source including a value for parameter M, said blocks being written on said N tracks in row major order K modulo M and in column major order K modulo MN, M lying in the closed integer interval (1,K); and (b) executing access requests from said external source over the N DASDs of the array such that each access of any subset of KN blocks formatted and written according to step (a) constitutes a synchronous exchange of b blocks at a time with b counterpart DASDs, and, further such that (N−b) other DASDs are concurrently available for binding to another access request and further such that the minimum number of blocks transferred in order to achieve a maximum data rate lies in the closed interval ((N−1, N−1)K) for any given M.

3. The method according to claim 2, wherein said formatting and writing step includes formatting and writing the array with KN blocks such that the tracks on the counterpart N−1 DASDs contain (N−1)K data blocks and further such that the track of the Nth DASD contains K parity blocks, each parity block spanning N−1 data blocks in column major order.

4. The method according to claim 3, wherein responsive to an update access modifying at least one data block at array location (i,j), the execution step further includes the steps of (c) synchronously reading the current data block at array location (i,j) and the current parity block at location (N,j), where i and j lie in the respective closed integer intervals (1,N−1) and (1,K);

(d) altering the contents of the data block read from location (i,j);

(e) calculating a new parity by XORing the current contents of the parity block read from location (N,j), and the current and altered contents of the data block read from location (i,j);and (f) synchronously writing the altered data block and the new parity block back in place.

5. The method according to claim 4, wherein said array further includes a cache operably responsive to said control means, and wherein the execution step further includes the step of:

(g) accessing said cache or a block at array location (i,j), and, in the event said data block is unavailable in said cache, staging blocks including said data block to said cache from array locations (i,j) through (i,K) on the ith DASD.

6. The method according to claim 3, wherein K parity blocks associated with a first group or logical track of KN blocks being stored on a first track of the Nth DASD, and further wherein K parity blocks associated with a second group or logical track of KN blocks being stored on a first track of the (N−1)th DASD, and further wherein the K parity blocks associated with a third group or logical track of KN blocks being stored on a first track of the (N−2)th DASD.

7. The method according to claim 2, wherein K parity blocks are distributed across N DASD of the array K modulo M such that exactly M parity blocks are written to the counterpart physical track of each DASD.

8. The method according to either claim 1 or 2, wherein the number of sequentially ordered blocks are T*KN, T being the number of logical tracks, and further wherein M lies in the closed integer interval (1,TK).

9. In a system having a CPU, an array of N DASDs, and means intercoupling the CPU and the array for synchronously accessing selectable ones of the DASDs, said means including means responsive to KN sequentially ordered blocks from said CPU for writing said blocks onto N DASDs in which a single parameter M specifies the trade off between data rate and concurrency, each DASD including a cyclic track recording medium, each track having a storage capacity of K blocks, wherein said intercoupling means further comprise:

(a) means for formatting and writing the KN blocks onto N tracks of the N DASDs of the array responsive to a command from said CPU including a value for parameter M, said blocks being written on said N tracks in row major order K modulo M and in column major order K modulo MN, M being less than or equal to K; and (b) means for executing access requests over the array from said CPU such that each access of any subset of KN blocks formatted and written according to step (a) constitutes a synchronous data exchange of b blocks at a time with b counterpart DASDs and further such that (N−b) DASDs are concurrently available for binding to another access request, M being an inverse function of b.

10. The system according to claim 9, wherein said accessing means further comprises:

(c) a cache for storing a predetermined number of blocks therein and responsive to access requests originating from the CPU for exchanging requested blocks with the CPU if available or cause the request to passed to the DASDs;

(d) means for staging blocks to the cache from the requested block to the physical end of track on the counterpart DASD.

* * * * *

UNITED STATES PATENT AND TRADEMARK OFFICE
CERTIFICATE OF CORRECTION

PATENT NO. : 5,263,145
DATED : November 16, 1993
INVENTOR(S) : Brady, et al.

It is certified that error appears in the above-indentified patent and that said Letters Patent is hereby corrected as shown below:

Column 11, Claim 2, Line 2, delete "partly", insert --parity--.

Signed and Sealed this

Nineteenth Day of July, 1994

Attest:

BRUCE LEHMAN

*Attesting Officer*      *Commissioner of Patents and Trademarks*